US010935004B2

(12) United States Patent
Fischer et al.

(10) Patent No.: US 10,935,004 B2
(45) Date of Patent: Mar. 2, 2021

(54) SPLITTABLE PITCH TUBE

(71) Applicants:ZF FRIEDRICHSHAFEN AG, Friedrichshafen (DE); ZF WIND POWER ANTWERPEN N.V., Lommel (BE)

(72) Inventors: Steffen Fischer, Nordkirchen (DE); Dirk Strasser, Breckerfeld (DE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 162 days.

(21) Appl. No.: 16/078,023

(22) PCT Filed: Jan. 26, 2017

(86) PCT No.: PCT/EP2017/051618
§ 371 (c)(1),
(2) Date: Aug. 21, 2018

(87) PCT Pub. No.: WO2017/144225
PCT Pub. Date: Aug. 31, 2017

(65) Prior Publication Data
US 2019/0063409 A1    Feb. 28, 2019

(30) Foreign Application Priority Data

Feb. 23, 2016  (DE) .................. 10 2016 202 735.2

(51) Int. Cl.
*F03D 80/80*   (2016.01)
*F03D 80/50*   (2016.01)

(52) U.S. Cl.
CPC ............. *F03D 80/85* (2016.05); *F03D 80/50* (2016.05); *F05B 2240/00* (2013.01); *Y02E 10/72* (2013.01)

(58) Field of Classification Search
CPC ...... F03D 80/85; F03D 80/50; F05B 2240/00; Y02E 10/721; F16L 25/00
USPC ...................................................... 290/44, 55
See application file for complete search history.

(56) References Cited

U.S. PATENT DOCUMENTS

| 4,548,431 | A | * | 10/1985 | Hall | ...................... | E21B 17/042 285/334 |
| 8,365,866 | B2 | | 2/2013 | Ciszak et al. | | |
| 8,376,708 | B2 | * | 2/2013 | Patel | ...................... | H02K 7/102 416/169 R |
| 2009/0095526 | A1 | * | 4/2009 | Lane | ...................... | E21B 19/083 175/24 |
| 2009/0236146 | A1 | * | 9/2009 | Pierz | ...................... | E21B 7/046 175/62 |
| 2010/0007151 | A1 | | 1/2010 | Ciszak et al. | | |
| 2011/0036560 | A1 | * | 2/2011 | Vail, III | .................. | E21B 28/00 166/87.1 |
| 2011/0068583 | A1 | * | 3/2011 | Burkart | ..................... | F03D 9/25 290/55 |

(Continued)

FOREIGN PATENT DOCUMENTS

DE        4035684 A1     5/1992
DE    102011117901 A1    5/2013
(Continued)

*Primary Examiner* — Aaron R Eastman
(74) *Attorney, Agent, or Firm* — Leydig, Voit & Mayer, Ltd.

(57) ABSTRACT

A pitch tube includes a first tube part and a second tube part. The first tube part and the second tube part are detachably connected to each other.

19 Claims, 4 Drawing Sheets

(56) References Cited

U.S. PATENT DOCUMENTS

| | | | | |
|---|---|---|---|---|
| 2013/0300125 | A1* | 11/2013 | Ruschoff | H02K 7/1838 |
| | | | | 290/55 |
| 2015/0211302 | A1* | 7/2015 | Beckwith | E21B 7/26 |
| | | | | 175/19 |
| 2016/0090967 | A1* | 3/2016 | Boland | F03D 80/70 |
| | | | | 184/4 |
| 2016/0341183 | A1 | 11/2016 | Smet | |

FOREIGN PATENT DOCUMENTS

| | | |
|---|---|---|
| DE | 102014200674 A1 | 7/2015 |
| EP | 2597307 A2 | 5/2013 |
| EP | 3001070 A1 | 3/2016 |

* cited by examiner

SPLITTABLE PITCH TUBE

CROSS REFERENCE TO RELATED APPLICATIONS

This application is a U.S. National Stage Application under 35 U.S.C. § 371 of International Application No. PCT/EP2017/051618 filed on Jan. 26, 2017, and claims benefit to German Patent Application No. DE 10 2016 202 735.2 filed on Feb. 23, 2016. The International Application was published in German on Aug. 31, 2017 as WO 2017/144225 A1 under PCT Article 21(2).

FIELD

The present invention refers to a pitch tube and to a tube part.

BACKGROUND

In wind turbine installations, in order to perform an adjustment of the pitch angle of the propeller (pitch adjustment), electrical cables are required, which extend between the rotor and a generator-side connector. In order to house these cables, usually a so-called pitch tube is used.

The assembling and disassembling of a pitch tube requires a sufficient free space to be provided within the engine pod. Correspondingly sized engine pods cannot be manufactured or are very expensive. Moreover, the handling of a long pitch tube is problematic.

The publications EP 2 597 307 A3 and US 2010/007 151 A2 disclose a double-walled pitch tube having an outer and an inner tube. The cavity formed between the inner and the outer tube is used for supplying lubricant. The electrical cables extend through the inner tube. A radial subdivision of the pitch tube is not contemplated.

SUMMARY

In an embodiment, the present invention provides a pitch tube including a first tube part and a second tube part. The first tube part and the second tube part are detachably connected to each other.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
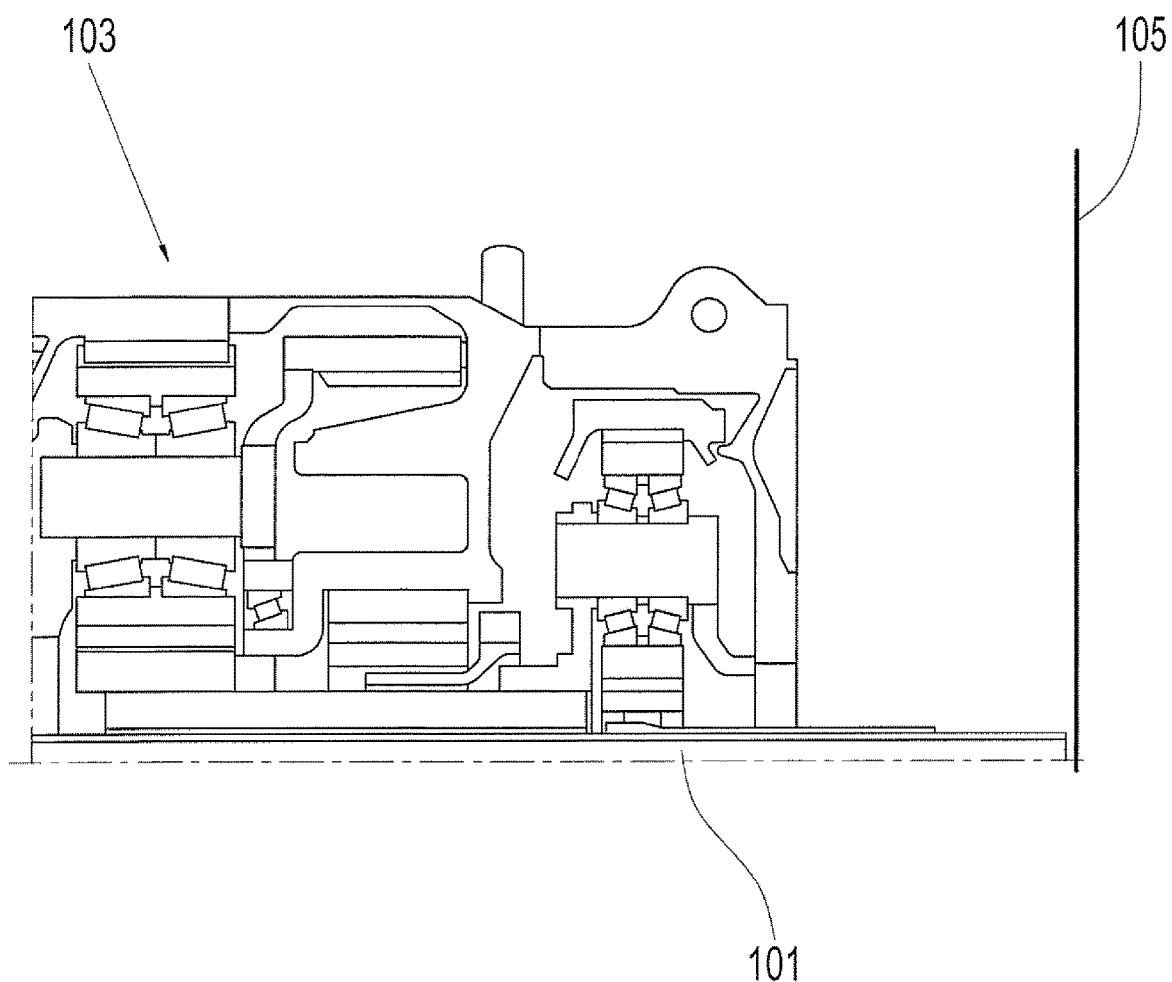
FIG. 1 shows a pitch tube known in the art.

Embodiments of the invention provide improved pitch tubes, which does not have the drawbacks of the solutions known in the state of the art. In particular, embodiments of the invention provide pitch tubes that can be easily handled and with which the assembly and disassembly of gears, in particular of wind turbine transmissions, can be simplified.

A pitch tube is considered to be a tube, i.e. a generally oblong hollow body having exactly two openings or mouths, in a wind turbine installation, which tube extends, at least partially, through a hollow rotor shaft of the wind turbine installation. At least a part of a cavity surrounding the rotor shaft is thus positioned between both mouths of the pitch tube. The rotor shaft connects a rotor, provided with a rotor hub and rotor propellers driven by wind, in a non-rotating way to an input shaft of a gearbox or a generator. This causes the pitch tube to also extend through the gearbox or generator, in particular through its input shaft. In a particular case, the rotor shaft and the input shaft of the gearbox may be integrally connected.

A pitch tube is used for passing signal cables, cables for energy supply and/or lubricant conduits. It extends coaxially to the rotation axis of the rotor shaft or the rotor. In particular, the rotation axis extends through both mouths of the pitch tube. The pitch tube has preferably a rotational symmetry, with a symmetry axis which is identical to the rotation axis of the rotor shaft or rotor.

Embodiments of the invention provide pitch tubes formed in two parts. They comprise a first tube part and a second tube part. Both tube parts are parts, which are produced in physically separate steps.

The pitch tubes have exactly two mouths. The first tube part forms a first mouth, while the second part forms a second mouth.

According to embodiments of the invention, the first tube part and the second tube part are detachably connected to each other. Both tube parts may thus be separately introduced into a gearbox or removed from the gearbox. This simplifies not only the assembly and disassembly of the pitch tube, but also the assembly and disassembly of the gearbox under conditions of limited space availability, such as inside an engine pod of a wind turbine installation.

The connection fixes the first tube part and the second tube part relatively to each other at least with respect to an axial displacement, i.e. a displacement along said rotation axis. Moreover, the fixing of the first tube part and of the second tube part relative to each other is performed with respect to radial movements, such as displacements in any direction perpendicular to the rotation axis.

In a preferred development, a first region of the first tube part and a first region of the second tube part are axially offset to each other. In particular, no radial overlapping is present between the first region of the first tube part and the first region of the second tube part. The first region of the first tube part and the first region of the second tube part are positioned on different sides of a plane, which extends in a radial, i.e. perpendicular direction, with respect to an axis. The axis is the rotation axis of the rotor shaft of a wind turbine installation, in which the pitch tube is housed.

A second region of the first tube part and a second region of the second tube part are preferably detachably connected to each other. The second region of the first tube part or of the second tube part are respectively different from said first regions. No radial overlapping is present between the first regions of the first tube part or of the second tube part and the second region of the first tube part or the second tube part. The second region of the first tube part and the second region of the second tube part, on the other hand, may radially overlap.

In a further preferred development, the first tube part and the second tube part or the second region of the first tube part and the second region of the second tube part are screwed to each other. In particular, the first tube part or the second region of the first tube part defines a first threading, the second tube part or the second region of the second tube part defines a second threading. The first and the second threading are screwed to each other.

Preferably, the first threading and the second threading are axially aligned. This means that a threading axis, i.e. an axis around which at least one thread of the threading is wound, is parallel to said rotation axis of the rotor shaft or is identical therewith.

Preferably, the first tube part and the second tube part are also provided with a first support surface. The first support surface of the first tube part and the first support surface of the second tube part support each other at least in at least one radial direction. Thus, the first support surfaces allow the mutual support of the first tube part and of the second tube part at least in at least one radial direction.

A support in at least one radial direction means that a direction vector, different from zero, of a force applied through the support extends in a radial direction, i.e. perpendicularly to said rotation axis. The support preferably occurs at least in each radial direction.

Moreover, the first tube part and the second tube part preferably define a respective second support surface. Also, the second support surfaces support each other at least in at least one radial direction. The explanations provided for the first support surfaces hold, mutatis mutandis, also for the second support surfaces. The first support surfaces and/or the second support surfaces preferably have a rotational symmetry with respect to said rotation axis.

Above said second region of the first tube part, in a preferred embodiment, is positioned axially between the first support surface and the second support surface of the first tube part. Moreover, the second region of the second tube part is preferably axially positioned between the first support surface and the second support surface of the second tube part.

The arrangement of an object axially between a second object and a third object generally implies that the first and the second object are on different sides of a first radial plane, which is thus perpendicular to a reference axis. The third object is on the same side of this plane, as the first object. The first and the third object are also on different sides of a second radial plane, which is thus perpendicular to the reference axis. The second object lies on the same side of this plane as the first object. In particular the second and the third object thus lie on different sides of the first plane; the second and the third object lie on different sides of the second plane.

According to a development, said rotation axis is the reference axis. Due to the positioning, according to this embodiment, of the second regions of the first tube part and of the second tube part between the support surfaces, in addition to the inventive connection of the first tube part and of the second tube part, a rigid fixing of the first tube part and of the second tube part is obtained. This fixing thus opposes any translational or rotational relative motion of the first tube part and of the second tube part.

In a further preferred embodiment, the first support surfaces and/or the second support surfaces have a cylindrical or conical form. This means that the support surfaces form an inner or outer enclosing surface of a cylinder or cone. It is particularly advantageous to use conical support surfaces, since these centers the first tube part and the second tube part during assembling. This allows the first tube part and second tube part to be "blindly" connected to each other within a gearbox. In the case of conical support surfaces, the inventive connection of the first tube part with the second tube part preferably exerts a force in an axial direction, which causes an axial tensioning of the first tube part and of the second tube part in the support surfaces.

Said first tube part is configured to be connected to said second tube part in order to form said pitch tube.

The pitch tube is preferably contained within a gearbox, such as a gearbox of a wind turbine installation. The first tube part is detachably connected, such as by screwing, to an input shat of this gearbox. This is advantageous in that not only the second tube part may be released from the first tube part, but the first tube part may also be released from the input shaft. In order to facilitate the disassembly also the first tube part may thus be displaced within the gearbox.

Preferred exemplary embodiments are shown in figures. Corresponding reference numerals indicate the same characteristics or functionally equivalent characteristics. In particular:

According to FIG. 1, a pitch tube 101 axially extends through a gearbox 103. The free space on the right side of gearbox 103—viewing from the perspective viewpoint of FIG. 1—is used for housing a generator. The pitch tube 103 is thus correspondingly extended laterally to the right side—viewing from the perspective viewpoint of FIG. 1.

FIG. 1 also shows a separation line 105. In order to connect the generator to the gearbox 103 or to disassemble the generator, it is necessary to displace the generator in an axial direction—in the perspective view of FIG. 1- to the right beyond the separation line 105.

Figure 2:
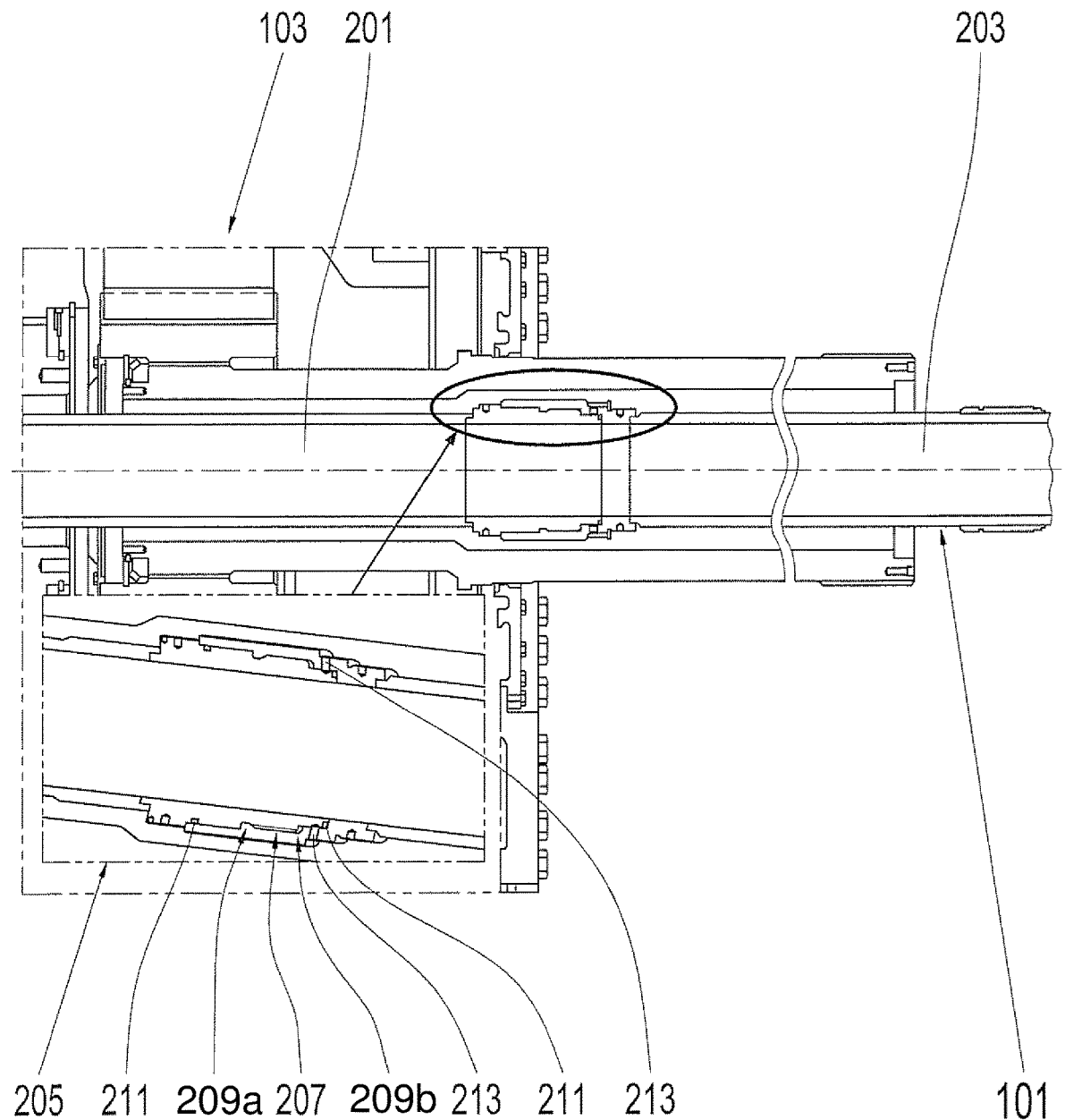
FIG. 2 shows a splittable pitch tube.
Figure 3:
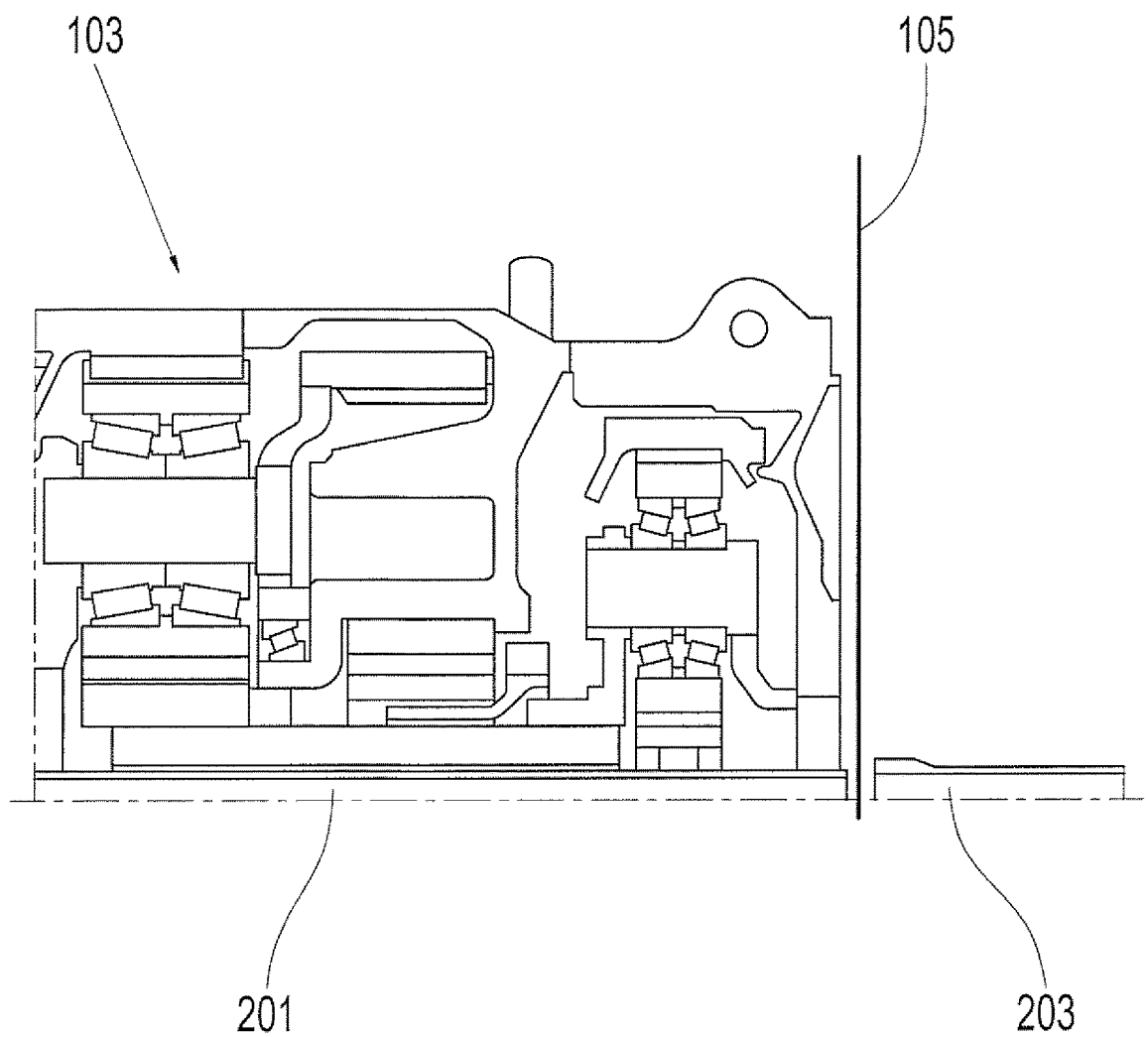
FIG. 3 shows the space required by the split pitch tube.
Figure 4:
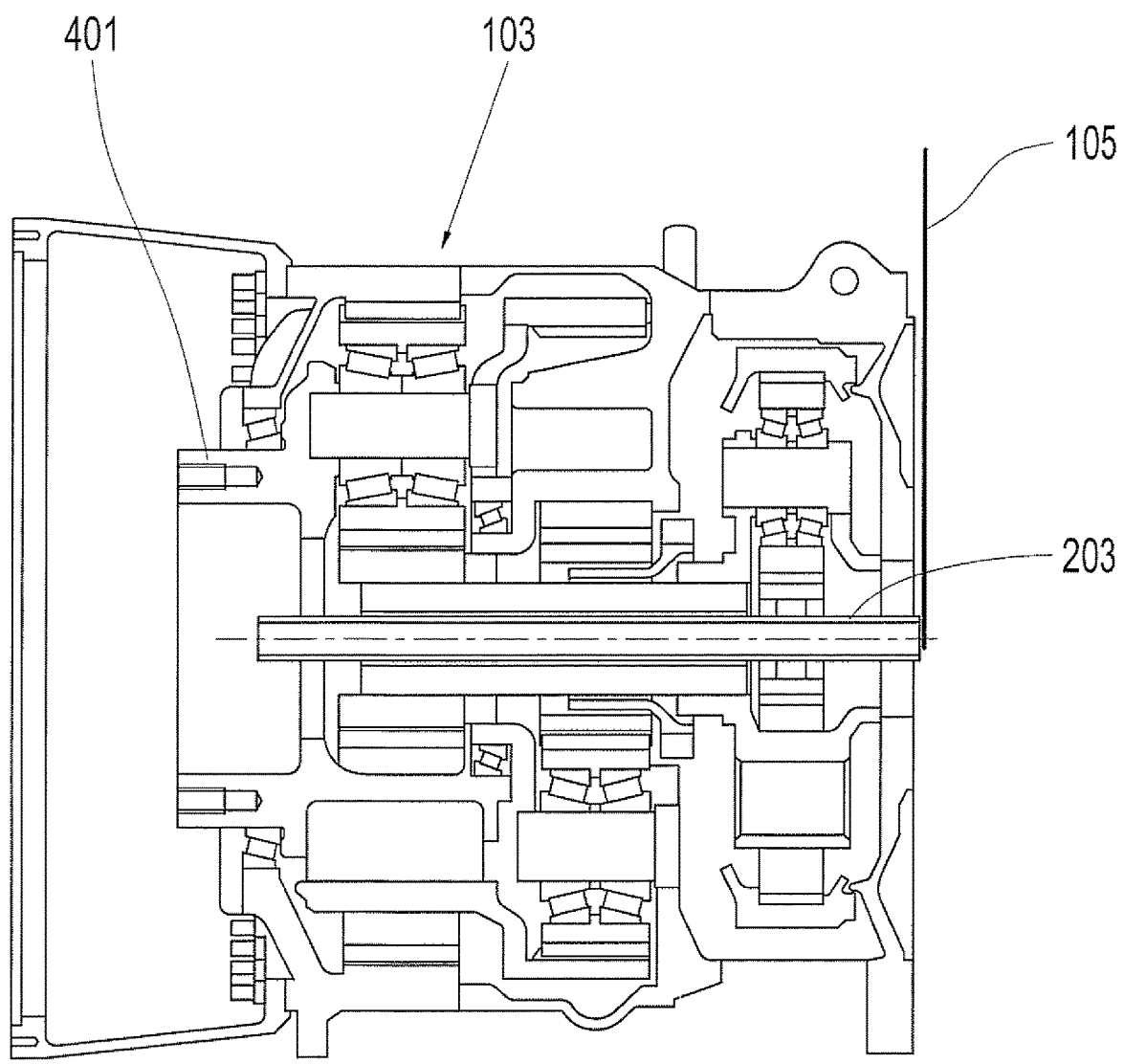
FIG. 4 shows the space required by a split, slidable pitch tube.

Contrary to the integral pitch tube 101 of FIG. 1, the pitch tube 101 shown in FIGS. 2 to 4 is provided in two parts, consisting of a first tube part 201 and a second tube part 203.

The first tube part 201 and the second tube part 203 are screwed to each other. This is shown in greater detail in detailed drawing 205. The threading of the first tube part 201 thus forms a screwed connection 207 with a threading of the second tube part 203. The threading of the first tube part 201 is an inner threading, while the threading of the second tube part 203 is an outer threading. The first tube part 201 and the second tube part 203 rest against each other in an axial direction—in the perspective view of FIG. 2—on the right and left side of the screwed connection 207 along conical surfaces 209a, 209b. A conical surface 209a, 209b of the first tube part 201 and a conical surface 209a, 209b of the second tube part 203 respectively form a pair of interacting surfaces for transmitting supporting forces between the first tube part 201 and the second tube part 203.

The conical form of surfaces 209a, 209b allows the first tube part 201 and the second tube part 203 to be "blindly" introduced, i.e. without any monitoring of the positions of both tube parts 201, 203, into the gearbox 103, and then screwing the same to each other. The conical form of surfaces 209a, 209b ensures the centering of the tube parts 201, 203.

The detailed drawing 205 also shows sealing rings 211, which are positioned in an area of an overlapping between the first tube part 201 and the second tube part 203 in an axial direction, as far out as possible. The sealing rings 211 seal the inner space of the pitch tube 101 with respect to the lubricant present inside the gearbox 103. Grub screws 213 are positioned inside the second tube part 203, for preventing a loosening of the screwed connection 207.

Due to the two-part embodiment of the pitch tube 201, the separation line 105 is displaced, as shown in FIG. 3, to the left, towards the gearbox 103. Therefore, the space required for assembling and disassembling is reduced.

A further reduction of the room requirements results from a releasable fixing of the second tube part 203 in a driven hollow shaft 401 of gearbox 103. This is shown in FIG. 4. The releasable fixing allows the second tube part 203 to be displaced to the left, or to the rotor side—when seen from the perspective viewpoint of FIG. 4. In this way, the separation line 105 is further moved towards the gearbox 103, so that the generator may be assembled and disassembled without the need for an axial displacement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 pitch tube
103 gearbox
105 separation line
201 first tube part
203 second tube part
205 detailed drawing
207 screwing
209a conical surface
209b conical surface
211 sealing ring
213 grub screw
401 hollow shaft

The invention claimed is:

1. A pitch tube for housing cables to be used in performing an adjustment of a pitch angle of a propeller of a wind turbine, the pitch tube comprising:
    a first tube part; and
    a second tube part;
    wherein the first tube part and the second tube part are configured to be detachably connected to each other so as to form a hollow body configured to carry the cables to be used in performing the adjustment of the pitch angle of the propeller of the wind turbine,
    wherein the first tube part includes a support surface and the second tube part includes a support surface,
    wherein the support surface of the first tube part and the support surface of the second tube part support each other in at least one radial direction,
    wherein the first tube part includes a second support surface and the second tube part includes a second support surface,
    wherein the second support surface of the first tube part and the second support surface of the second tube part support each other in at least one radial direction,
    wherein a first region of the first tube part and a first region of the second tube part are axially offset relative to each other,
    wherein a second region of the first tube part and a second region of the second tube part are detachably connected to each other,
    wherein the second region of the first tube part is axially positioned between the support surface and the second support surface of the first tube part,
    wherein the second region of the second tube part is axially positioned between the support surface and the second support surface of the second tube part,
    wherein the support surface of the first tube part and the support surface of the second tube part are conical, and
    wherein the second support surface of the first tube part and the second support surface of the second tube part are conical.

2. The pitch tube of claim 1, wherein the first support surfaces and/or the second support surfaces are cylindrical or conical.

3. A pitch tube for housing cables to be used in performing an adjustment of a pitch angle of a propeller of a wind turbine, the pitch tube comprising:
    a first tube part;
    a second tube part; and
    grub screws positioned inside the second tube part,
    wherein the first tube part and the second tube part are configured to be detachably connected to each other so as to form a hollow body configured to carry the cables to be used in performing the adjustment of the pitch angle of the propeller of the wind turbine,
    wherein the first tube part and the second tube part are configured to be detachably connected to each other by being configured to form a screwed connection with each other, and
    wherein the grub screws are configured to preserve the screwed connection formed between the first tube part and the second tube part.

4. The pitch tube of claim 3, wherein a first region of the first tube part and a first region of the second tube part are axially offset relative to each other.

5. The pitch tube of claim 4, wherein a second region of the first tube part and a second region of the second tube part are detachably connected to each other.

6. The pitch tube of claim 3, wherein the first tube part has a first threading,
    wherein the second tube part has a second threading, and
    wherein the first threading and the second threading are configured to be screwed together.

7. The pitch tube of claim 6, wherein the first threading and the second threading are axially aligned.

8. The pitch tube of claim 3, wherein the first tube part includes a support surface and the second tube part includes a support surface, and
    wherein the support surface of the first tube part and the support surface of the second tube part support each other in at least one radial direction.

9. The pitch tube of claim 8, wherein the first tube part includes a second support surface and the second tube part includes a second support surface;
   wherein the second support surface of the first tube part and the second support surface of the second tube part support each other in at least one radial direction.

10. The pitch tube of claim 9, wherein a first region of the first tube part and a first region of the second tube part are axially offset relative to each other,
   wherein a second region of the first tube part and a second region of the second tube part are detachably connected to each other,
   wherein the second region of the first tube part is axially positioned between the support surface and the second support surface of the first tube part;
   wherein the second region of the second tube part is axially positioned between the support surface and the second support surface of the second tube part.

11. The pitch tube of claim 10, wherein the support surface of the first tube part and the support surface of the second tube part are conical, and
   wherein the second support surface of the first tube part and the second support surface of the second tube part are conical.

12. A gearbox for a wind turbine, the gearbox comprising:
   an input shaft; and
   a pitch tube configured to house cables configured to carry signals for performing an adjustment of a pitch angle of a propeller of the wind turbine, the pitch tube comprising:
      a first tube part, and
      a second tube part,
   wherein the first tube part and the second tube part are configured to be detachably connected to each other, and
   wherein the pitch tube extends through the input shaft.

13. The gearbox of claim 12, wherein the first tube part includes a support surface and the second tube part includes a support surface, and
   wherein the support surface of the first tube part and the support surface of the second tube part support each other in at least one radial direction.

14. The gearbox of claim 13, wherein the first tube part includes a second support surface and the second tube part includes a second support surface;
   wherein the second support surface of the first tube part and the second support surface of the second tube part support each other in at least one radial direction.

15. The gearbox of claim 14, wherein a first region of the first tube part and a first region of the second tube part are axially offset relative to each other,
   wherein a second region of the first tube part and a second region of the second tube part are detachably connected to each other,
   wherein the second region of the first tube part is axially positioned between the support surface and the second support surface of the first tube part;
   wherein the second region of the second tube part is axially positioned between the support surface and the second support surface of the second tube part.

16. The gearbox of claim 15, further comprising grub screws positioned inside the second tube part,
   wherein the first tube part and the second tube part are configured to be detachably connected to each other by being configured to form a screwed connection with each other, and
   wherein the grub screws are configured to maintain the screwed connection formed between the first tube part and the second tube part.

17. The gearbox of claim 12, wherein the input shaft is integrally connected with a rotor shaft of a rotor of a generator of the wind turbine.

18. The gearbox of claim 12, wherein the first tube part is detachably connected to the input shaft.

19. The gearbox of claim 18, wherein the first tube part is detachably connected to the input shaft via a threaded connection.

* * * * *